US012269547B2

(12) United States Patent
Jordan et al.

(10) Patent No.: US 12,269,547 B2
(45) Date of Patent: Apr. 8, 2025

(54) SEAT POST ASSEMBLY WITH AUTOMATIC POWER CONNECTOR

(71) Applicant: SRAM, LLC, Chicago, IL (US)

(72) Inventors: Brian Jordan, Highland Park, IL (US); Charles Dunlap, Manitou Springs, CO (US); Sage Hahn, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 76 days.

(21) Appl. No.: 17/991,205

(22) Filed: Nov. 21, 2022

(65) Prior Publication Data

US 2024/0166285 A1    May 23, 2024

(51) Int. Cl.
*B62J 1/08* (2006.01)
*B62J 1/06* (2006.01)
*B62K 3/02* (2006.01)
*B62K 19/36* (2006.01)

(52) U.S. Cl.
CPC ...................... *B62J 1/06* (2013.01)

(58) Field of Classification Search
CPC .......... B62J 2001/085; B62J 1/08; B62J 1/10
See application file for complete search history.

(56) References Cited

U.S. PATENT DOCUMENTS

| 8,016,349 | B2 | 9/2011 | Mouri et al. |
| 8,091,910 | B2 | 1/2012 | Hara et al. |
| 8,246,065 | B1 | 8/2012 | Kodama et al. |
| 8,308,124 | B2 | 11/2012 | Hsu |
| 8,317,261 | B2 * | 11/2012 | Walsh ........................ B62J 1/08 297/215.13 |
| 8,328,454 | B2 | 12/2012 | McAndrews et al. |

(Continued)

FOREIGN PATENT DOCUMENTS

| CN | 203345112 U | 12/2013 |
| CN | 201320667836 | 5/2014 |

(Continued)

OTHER PUBLICATIONS

Overholt, Zack; Taipei Cycle Show: KS Hints Towards the Future Of Electronic Dropper Posts; Website: https://bikerumor.com/taipei-cycle-show-ks-hints-towards-the-future-of-electronic-dropper-posts/, last checked Feb. 1, 2023.

(Continued)

*Primary Examiner* — Shin H Kim

(57) ABSTRACT

A seat post assembly includes a first tube moveable along an axis between a first position and a second position and a second tube telescopically moveable along the axis relative to the first tube between a retracted position and an extended position. A positioning assembly configured to adjustably position the second tube relative to the first tube. An electric actuator is adapted to be automatically electrically connected to a power source when the first tube is moved from the first position to the second position, and automatically electrically disconnected from the power source when the first tube is moved from the second position to the first position. The electric actuator is movable to actuate the positioning assembly in response to an electrical current adapted to be transmitted from the power source when the first tube is in the first position to adjustably position the second tube relative to the first tube.

26 Claims, 15 Drawing Sheets

(56) References Cited

U.S. PATENT DOCUMENTS

| | | |
|---|---|---|
| 8,814,109 B2 | 8/2014 | Laird et al. |
| 8,833,786 B2 | 9/2014 | Camp et al. |
| 8,833,848 B2 | 9/2014 | Shirai |
| 9,272,745 B2 | 3/2016 | Camp et al. |
| 9,422,018 B2 | 8/2016 | Pelot et al. |
| 9,499,224 B2 | 11/2016 | Shirai |
| 9,511,809 B2 | 12/2016 | Kodama et al. |
| 9,540,063 B1 * | 1/2017 | Shirai .................. B62J 1/08 |
| 9,840,294 B2 | 12/2017 | Hara |
| 10,040,499 B2 | 8/2018 | Hara et al. |
| 10,137,964 B2 | 11/2018 | Kurokawa et al. |
| 10,322,762 B2 | 6/2019 | Shirai |
| 10,336,400 B2 | 7/2019 | Hara |
| 10,358,180 B2 | 7/2019 | Shipman et al. |
| 10,392,020 B2 | 8/2019 | Komatsu et al. |
| 10,472,013 B2 | 11/2019 | Pelot et al. |
| 10,513,300 B2 * | 12/2019 | Bowers .................. B62K 3/02 |
| 10,549,803 B2 | 2/2020 | Shipman et al. |
| 10,604,201 B2 | 3/2020 | Shirai et al. |
| 10,611,433 B2 | 4/2020 | Chambers |
| 10,618,589 B2 | 4/2020 | Hara et al. |
| 10,676,146 B2 | 6/2020 | Hara et al. |
| 10,710,662 B2 | 7/2020 | Bowers et al. |
| 10,737,546 B2 | 8/2020 | Tong |
| 10,752,307 B2 | 8/2020 | Eberlberger |
| 10,759,483 B2 | 9/2020 | Hara et al. |
| 10,787,215 B1 | 9/2020 | Staples |
| 10,807,667 B2 | 10/2020 | Shipman et al. |
| 10,807,670 B2 | 10/2020 | Krugman et al. |
| 10,829,173 B2 | 11/2020 | Hara et al. |
| 10,843,757 B2 | 11/2020 | Komatsu et al. |
| 10,953,950 B2 | 3/2021 | Komatsu et al. |
| 10,988,198 B2 | 4/2021 | Komatsu et al. |
| 10,988,205 B2 | 4/2021 | Tsuchizawa et al. |
| 11,001,323 B2 | 5/2021 | Kurokawa |
| 11,066,118 B2 | 7/2021 | Katsuki et al. |
| 11,066,126 B2 | 7/2021 | Kurokawa et al. |
| 11,104,395 B2 | 8/2021 | Staples |
| 11,136,083 B2 | 10/2021 | Shirai |
| 11,161,565 B2 | 11/2021 | Kurotobi et al. |
| 11,180,211 B2 * | 11/2021 | Hara .................. B62J 43/30 |
| 11,518,477 B2 * | 12/2022 | Shirai .................. B62M 25/08 |
| 11,649,002 B2 * | 5/2023 | Shipman .................. B62J 1/08 297/215.13 |
| 11,964,722 B2 * | 4/2024 | Staples .................. B62J 1/08 |
| 2006/0175792 A1 * | 8/2006 | Sicz .................. B62J 1/08 280/200 |
| 2013/0202938 A1 | 8/2013 | Fujii |
| 2017/0282986 A1 | 10/2017 | Jhou et al. |
| 2018/0186419 A1 * | 7/2018 | Shipman .................. B62K 19/36 |
| 2019/0061851 A1 * | 2/2019 | Kurokawa .................. B62J 1/08 |
| 2019/0092116 A1 | 3/2019 | Magnus et al. |
| 2019/0193800 A1 * | 6/2019 | Hara .................. B62J 45/41 |
| 2019/0351966 A1 * | 11/2019 | Shirai .................. B62J 1/08 |
| 2020/0023918 A1 * | 1/2020 | Shirai .................. B62J 1/08 |
| 2020/0140029 A1 * | 5/2020 | Shipman .................. B62J 1/08 |
| 2020/0148300 A1 | 5/2020 | Komatsu et al. |
| 2020/0317283 A1 | 10/2020 | Staples |
| 2020/0377176 A1 | 12/2020 | Shirai et al. |
| 2021/0001941 A1 | 1/2021 | Shipman et al. |
| 2021/0024154 A1 | 1/2021 | Hara et al. |
| 2021/0031851 A1 | 2/2021 | Watson |
| 2021/0107581 A1 | 4/2021 | Hara et al. |
| 2021/0107588 A1 | 4/2021 | Sakagawa et al. |
| 2021/0206443 A1 | 7/2021 | Sakagawa et al. |
| 2021/0403111 A1 * | 12/2021 | Chambers .................. B62J 1/06 |
| 2022/0041237 A1 | 2/2022 | Tso et al. |
| 2022/0106005 A1 | 4/2022 | Shirai et al. |
| 2023/0021733 A1 * | 1/2023 | Endo .................. H02J 50/10 |
| 2023/0211845 A1 * | 7/2023 | Shipman .................. B62J 1/08 297/215.13 |
| 2023/0234661 A1 * | 7/2023 | Holaday .................. B62J 1/08 297/215.13 |

FOREIGN PATENT DOCUMENTS

| | | |
|---|---|---|
| CN | 204489030 U | 7/2015 |
| CN | 107685824 B2 | 9/2020 |
| DE | 102016010845 | 4/2017 |
| DE | 102016010857 | 4/2017 |
| DE | 102018102783 A1 | 9/2018 |
| DE | 102018119985 A1 | 2/2019 |
| DE | 102021123822 A1 | 4/2022 |
| EP | 2457811 | 5/2012 |
| EP | 2657113 | 10/2014 |
| EP | 2865586 | 4/2015 |
| EP | 2886428 | 6/2015 |
| TW | M378163 U | 4/2010 |
| TW | 201217209 | 5/2012 |
| TW | I562922 | 12/2016 |
| TW | I671226 | 9/2019 |

OTHER PUBLICATIONS

Levy, Mike; First Look: KS Electronic Wireless Dropper Post—Taipei Show 2014; https://www.pinkbike.com/news/ks-electronic-wireless-dropper-post-first-look.html, last checked Feb. 1, 2023.

* cited by examiner

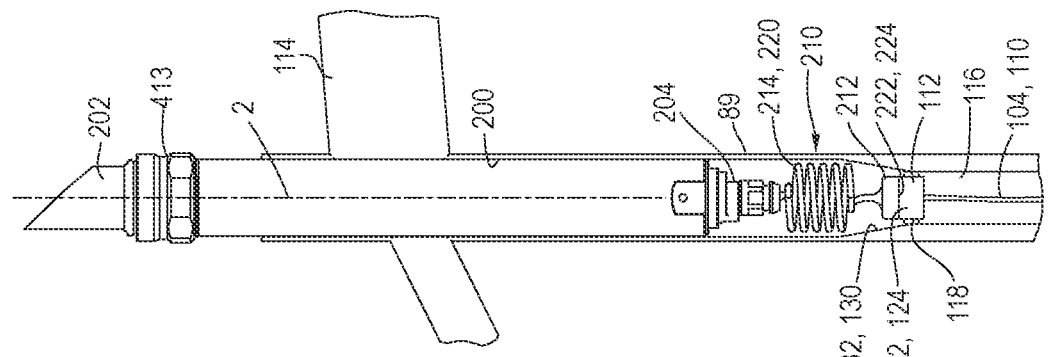
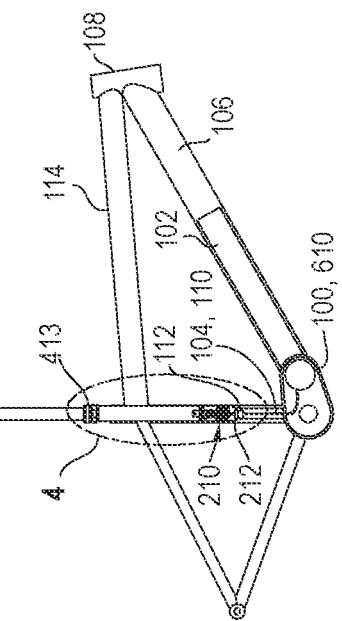
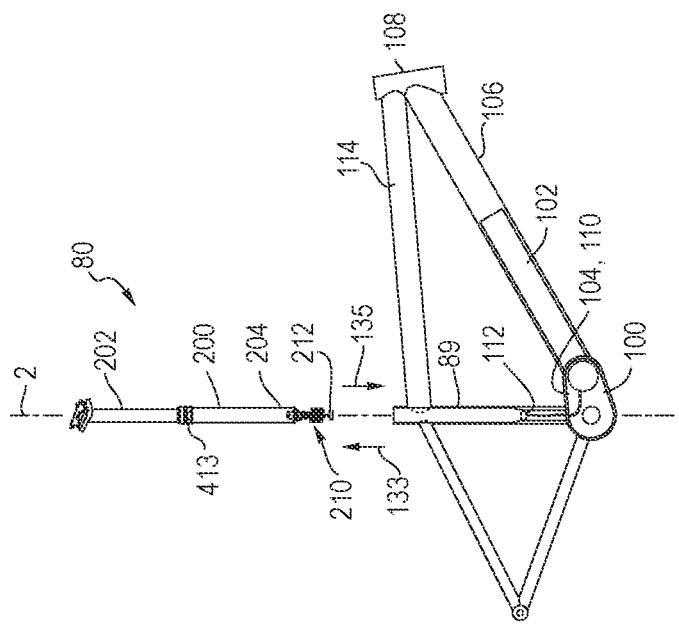

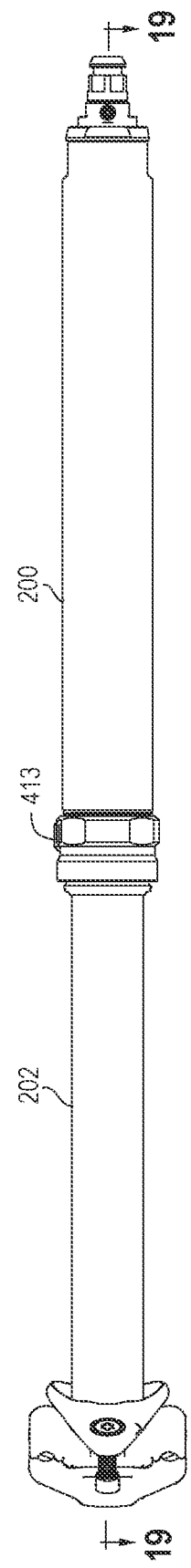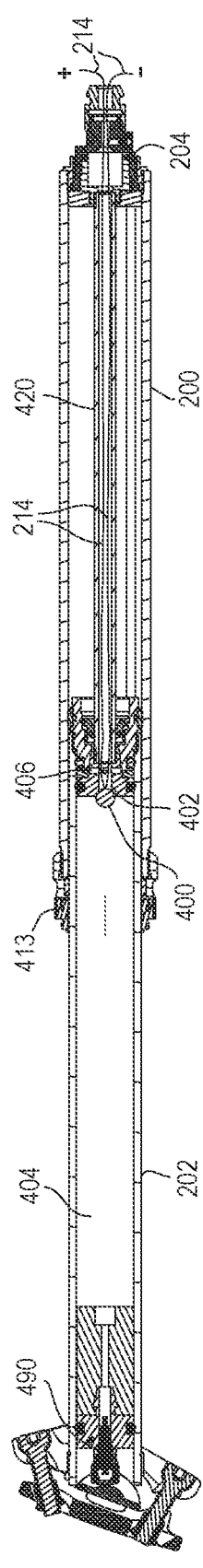
FIG. 18
FIG. 19

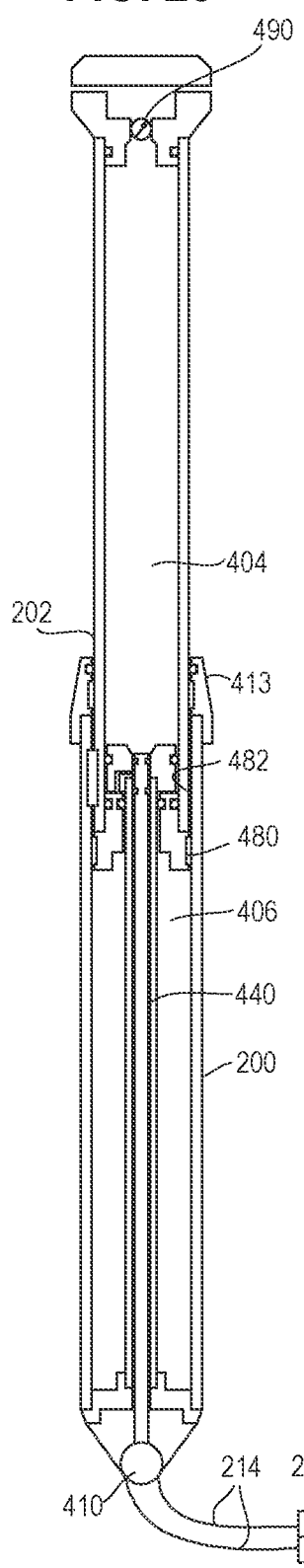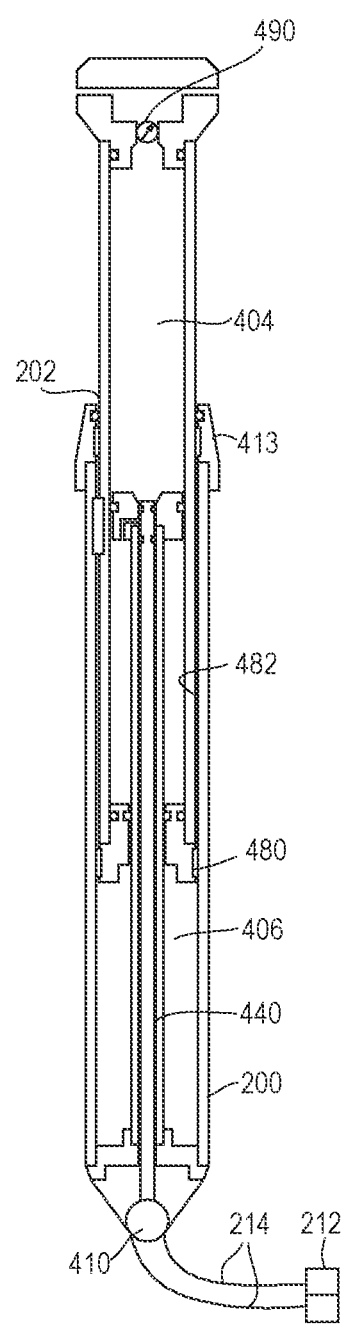

SEAT POST ASSEMBLY WITH AUTOMATIC POWER CONNECTOR

FIELD OF THE DISCLOSURE

The present application generally relates to an adjustable seat post assembly, and in particular to a seat post assembly with an automatic power connector, and to a bicycle and/or motor with an automatic power connector for the seat post assembly, and to methods for assembling and using the seat post assembly.

BACKGROUND

Bicycles may be configured with user adjustable seat posts. In some systems, the height of the seat post may be electronically controlled by the user, which requires a seat post power source, such as a battery. The battery is typically installed on the seat or seat post.

Electric assist bicycles may be configured with a motor powered by an electric assist bicycle power source, configured for example as a battery, which is typically separate from and much larger than the seat post power source. The electric assisted bicycle power source is typically housed in difficult to access, internal frame locations. As such, the process of coupling the seat post to, and de-coupling the seat post from, the electric assist bicycle battery may be challenging when installing and/or servicing the electric assist bicycle power source and/or seat post.

SUMMARY

In one aspect, one embodiment of a seat post assembly includes a first tube moveable along an axis between a first position and a second position and a second tube telescopically moveable along the axis relative to the first tube between a retracted position and an extended position. A positioning assembly is configured to adjustably position the second tube relative to the first tube. An electric actuator is adapted to be automatically electrically connected to a power source when the first tube is moved from the first position to the second position, and automatically electrically disconnected from the power source when the first tube is moved from the second position to the first position. The electric actuator is moveable to actuate the positioning assembly in response to an electrical current adapted to be transmitted from the power source when the first tube is in the first position to adjustably position the second tube relative to the first tube.

In another aspect, one embodiment of a seat post assembly includes a first tube having a first end and a second end and a second tube telescopically moveable along an axis relative to the first tube between a retracted position and an extended position. An electrical connector extends from a first end of the first tube. The electrical connector includes an end terminal moveable toward and away from the first end of the first tube and a biasing member, otherwise referred to as a force providing member, configured to bias the end terminal away from the first end of the tube. In various embodiments, the biasing member may include one or more of a spring, a magnetic material and/or a ferromagnetic material. An electric actuator is electrically connected to the electrical connector. The electric actuator is moveable between first and second positions in response to an electrical current adapted to be transmitted through the electrical connector. A valve is actuatable between a closed position when the electric actuator is in the first position and an open position when the electric actuator is in the second position.

In yet another aspect, one embodiment of a seat post assembly includes a first tube having a first end and a second end and a second tube telescopically moveable along an axis relative to the first tube between a retracted position and an extended position. An electrical connector is located at a first end of the first tube and includes a first terminal. An electric actuator is electrically connected to the electrical connector, wherein the electric actuator is moveable between first and second positions in response to an electrical current transmitted through the electrical connector. A valve is actuatable between a closed position when the electric actuator is in the first position and an open position when the electric actuator is in the second position. A power source is located remote to the first and second tubes, with a power source connector extending from the power source. The power source connector includes an end terminal and a biasing member biasing the end terminal into engagement with the first terminal. In various embodiments, the biasing member may include one or more of a spring, a ferromagnetic material and/or a magnetic material.

In one exemplary embodiment, the first end of the first tube is inserted into a receiver tube along an axis, which includes a guide surface forming an angle less than 90 degrees relative to the axis. The guide surface is engageable with the end terminal as the first tube is inserted into the receiver tube. In one embodiment, the guide surface may have a frustoconical shape.

The various embodiments of the seat post assembly, bicycle motor, power source and methods for the use and assembly thereof provide significant advantages over other seat post assemblies, bicycles, and methods. For example and without limitation, the electrical connector(s) provide an interface for automatically electronically coupling and decoupling the seat post with an electric assist bicycle battery housed in or on the frame. The automatic coupling and decoupling may be achieved merely by inserting the seat post into, or pulling the seat post out of, the receiver tube, with no additional manipulation of the connectors required by the user. In this way, the electrical connector(s) define an automatic power connector for the seat post.

The foregoing paragraphs have been provided by way of general introduction and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present disclosure will become apparent upon reading the following description in conjunction with the drawing figures, in which:

FIG. 2 is a sectional view of a bicycle frame with a portion of the bicycle frame removed to show an interior of the frame and a seat post assembly in a first, disengaged position.

FIG. 3 is a sectional view of a bicycle frame with a portion of the bicycle frame removed to show a seat post assembly in a second, engaged position.

FIG. 4 is an enlarged partial sectional view of the seat post assembly and bicycle frame taken along line 4 of FIG. 3.

FIG. 18 is a side view of another embodiment of a seat post assembly.

FIG. 19 is a cross sectional view of the seat post assembly taken along line 19-19 in FIG. 18.

FIG. 25 is a sectional view of a schematic of one embodiment of a seat post assembly in a raised position.

FIG. 26 is a sectional view of a schematic of one embodiment of a seat post assembly in an intermediate position.

DETAILED DESCRIPTION OF THE DISCLOSURE

It should be understood that the term "plurality," as used herein, means two or more. The term "longitudinal," as used herein means of or relating to a length or lengthwise direction. The term "lateral," as used herein, means situated on, directed toward or running in a side-to-side direction. The term "coupled" means connected to or engaged with, whether directly or indirectly, for example with an intervening member, and does not require the engagement to be fixed or permanent, although it may be fixed or permanent. The term "connected" may refer to an electrical or mechanical connection. The term "communicating" refers to a connection allowing for the transfer of power and/or data and may include a wired or wireless connection. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 50, shown in FIG. 1, from the perspective of a user seated thereon, for example with an "inboard" component or feature being closer to a vertical mid-plane of the bicycle extending in a direction A. The term "transverse" means non-parallel. The terms "outer" and "outwardly" refers to a direction or feature facing away from a centralized location, for example the phrases "radially outwardly," "radial direction" and/or derivatives thereof, refer to a feature diverging away from a centralized location, for example a longitudinal axis 2 of a seat post assembly as shown in FIG. 2. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle 50.

Figure 1:
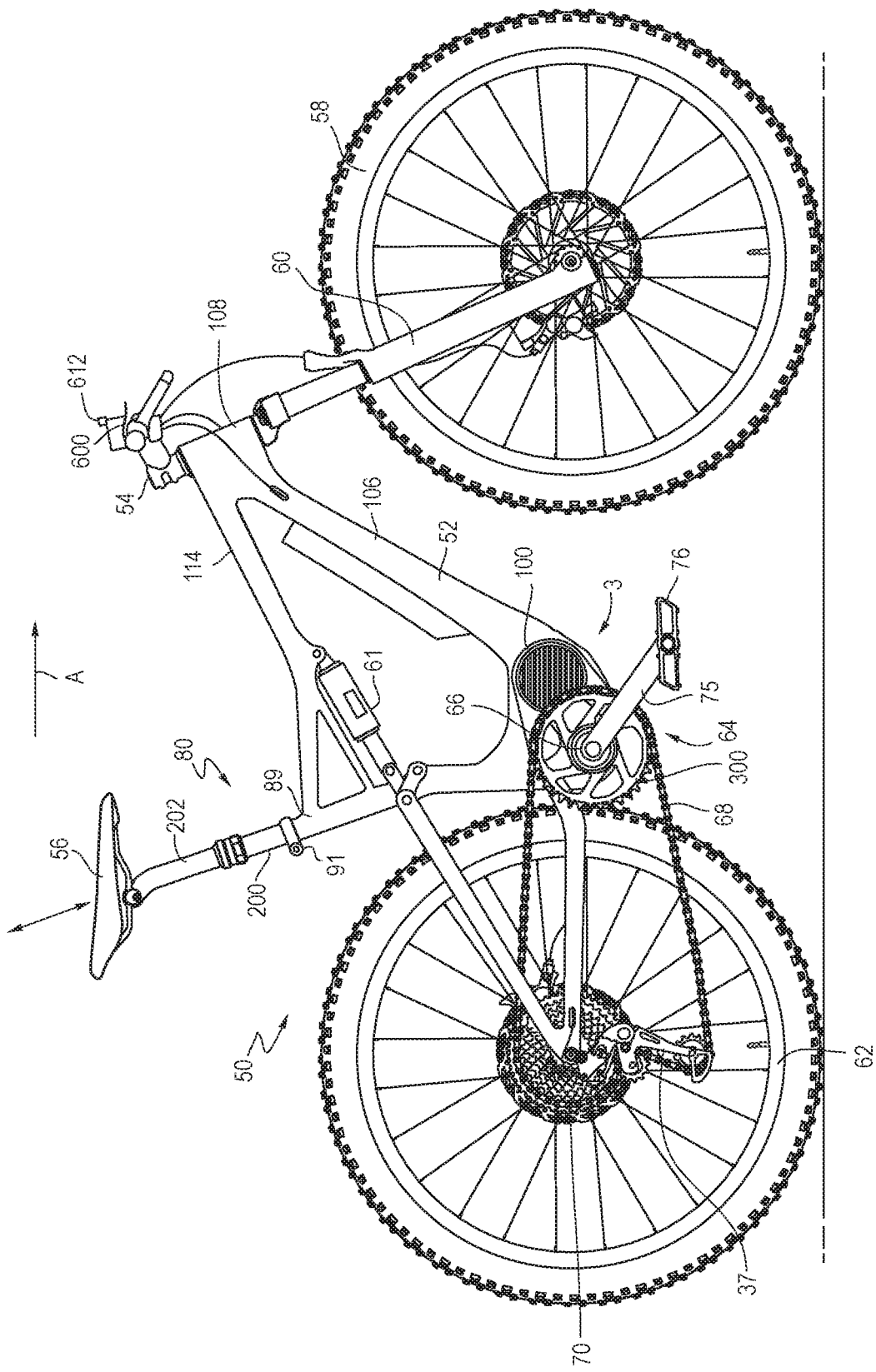
FIG. 1 is a side view of one example of a bicycle.

FIG. 1 illustrates one example of a human powered vehicle, which may also include an electrically powered drive system 3. In this example, the vehicle is one possible type of bicycle 50, such as a mountain bicycle. The bicycle 50 has a frame 52, handlebars 54 near a front end of the frame, and a seat 56, otherwise referred to as a saddle, for supporting a rider over a top of the frame 52. The bicycle 50 has a first or front wheel 58 carried by a front fork subassembly 60 supporting the front end of the frame 52. The bicycle 50 also has a second or rear wheel 62 supporting a rear end of the frame 52. The rear end of the frame 52 may be supported by a rear suspension component 61, such as a rear shock. The bicycle 50 has a drive train 64 with a crank assembly 66 that is operatively coupled via a roller chain 68 to a rear cassette 70, or a driven sprocket assembly, near the hub providing a rotation axis of the rear wheel 62. The crank assembly 66 includes at least one, and typically two, crank arms 75 and pedals 76, along with a front chainring assembly 300 or a drive sprocket assembly. A crank spindle or shaft may connect the two crank arms. The crank shaft defines a center rotational axis of the chainring assembly 300. The crank assembly may also include other components.

A rear gear change device 37, such as a derailleur, is disposed at the rear wheel 62 to move the roller chain 68 through different sprockets of the cassette 70. In one embodiment, a front gear changer device (not shown), such as a derailleur, may be provided to move the chain 68 through multiple sprockets of the chainring assembly, if present. In FIG. 1, the arrow A depicts a normal riding or forward moving direction of the bicycle 50.

In the illustrated example, the seat 56 is supported on a seat post assembly 80, which includes a lower first tube 200 and an upper second tube 202 telescopically moveable relative to the first tube 200 along the longitudinal axis 2. A collar 413 is coupled to the upper portion of the lower, first tube 200 and slidingly engages the upper, second tube 202. The first tube 200 has an end portion 204, otherwise referred to as a bottom assembly received in a top of a frame seat tube of the frame, otherwise referred to as a receiver tube 89. It should be understood that the term "tube" refers to a tubular structure, but may include other components coupled thereto, such as the end portion 204, which closes off the end of the tubular structure. A clamping ring 91 may be tightened to secure the first tube 200 to the receiver tube 89. The lower, first tube 200 may be moved along the longitudinal axis 2 from a disengaged, first position, shown in in FIG. 2, to an engaged, second position, shown in FIG. 3, wherein the lower, first tube 200 is inserted into the frame receiver tube 89 to a desired height position, whereinafter the lower, first tube 200 may be fixed to the frame 52, and the receiver tube 89 in particular, with the clamping ring 91. In this way, the first tube 200 is moveable along the axis 2 between a first position and a second position. The second tube 202 is telescopically moveable along the axis 2 relative to the first tube 200 between a retracted position and an extended position.

Referring to FIGS. 1-9, the drive system 3 includes a drive unit 100 mounted on the frame 52 and coupled to the crank assembly 66. As shown in FIGS. 1-3, the drive unit 100, otherwise referred to as a motor system, is located off-center and forward of the crank assembly 66.

The drive unit 100 may be powered to assist, partially or entirely, with the rotation of the crank assembly 66, the associated movement of the chain 68, and the associated rotation of the cassette 70 and rear wheel 62. The drive unit 100 may be electrically coupled to an energy storage device 102, otherwise referred to as a battery or power source, which supplies power to the drive unit 100. As shown in FIGS. 1-3, the power source 102 is located remote to the seat post assembly, including the first and second tubes 200, 202, meaning the power source is not directly mounted on or in the seat post assembly 80 or seat 56. It should be understood, however, that a secondary power source may be directly mounted on or in the seat post assembly or seat to provide power to the seat post assembly, as needed. In one embodiment, the bicycle frame 52 includes a downtube 106, which extends from the crank assembly 66 region to a head tube 108, where the fork 60 and handlebars 54 are rotatably attached to the bicycle frame 52. The power source 102 may be positioned in the downtube 106 as shown in FIGS. 2, 3, 5 and 7. In other embodiments, the power source 102 may be secured to any part of the frame 52, including for example and without limitation in or on a top tube 114.

Due to the remote location of the power source 102, a power source connector 104 extends from the power source 102, as shown in FIGS. 2-4 and 7-9. The power source connector 104 includes one or more flexible wire(s) 110 and an end terminal 112. The end terminal 112 may be fixed in an interior space 116 at a bottom of the receiver tube, as shown in FIG. 4, for example with a ring connector 118 or gasket, adhesive, a threadable connection, a clip, or any other suitable connection. The fixed connection refers to the end terminal 112 not being moveable along the longitudinal axis 2, even when loaded for example by a connector 210 pushing or pulling on the end terminal 112 by way of a biasing member 220, 222, 224.

Figure 6:
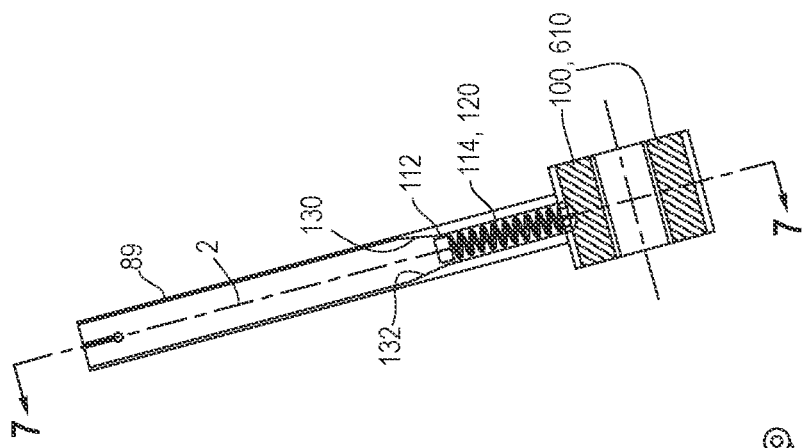
FIG. 6 is a cross-sectional view of the bicycle frame and electrical connector taken along line 6-6 of FIG. 5.
Figure 7:
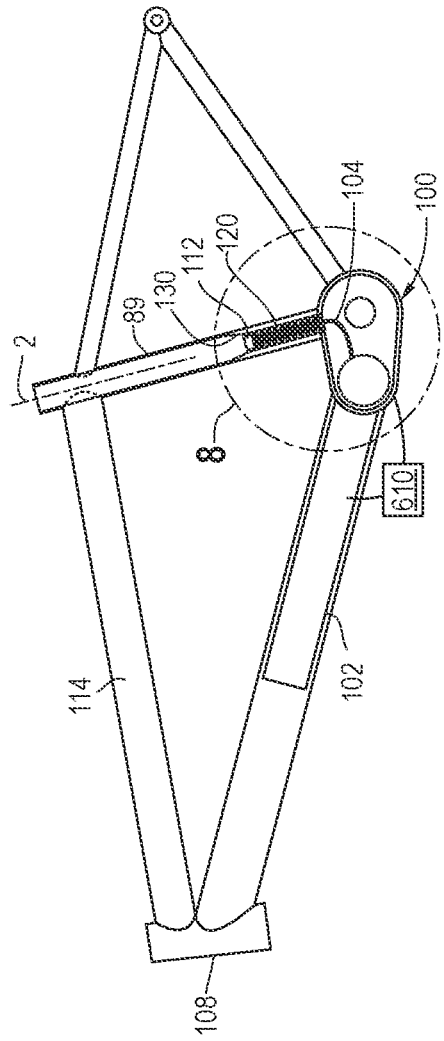
FIG. 7 is a sectional view of the bicycle frame with a portion of the bicycle frame removed to show the electrical connector taken along line 7-7 of FIG. 6.
Figure 8:
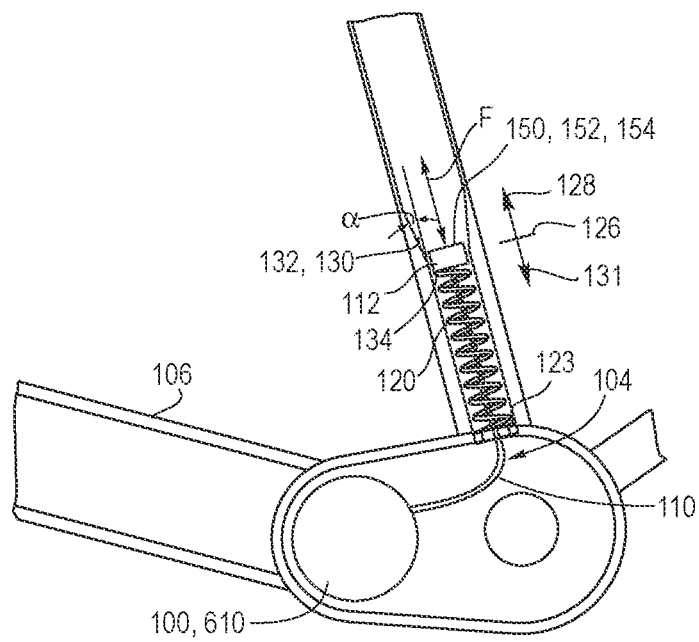
FIG. 8 is an enlarged partial sectional view of the bicycle frame and electrical connector taken along line 8 of FIG. 7.
Figure 9:
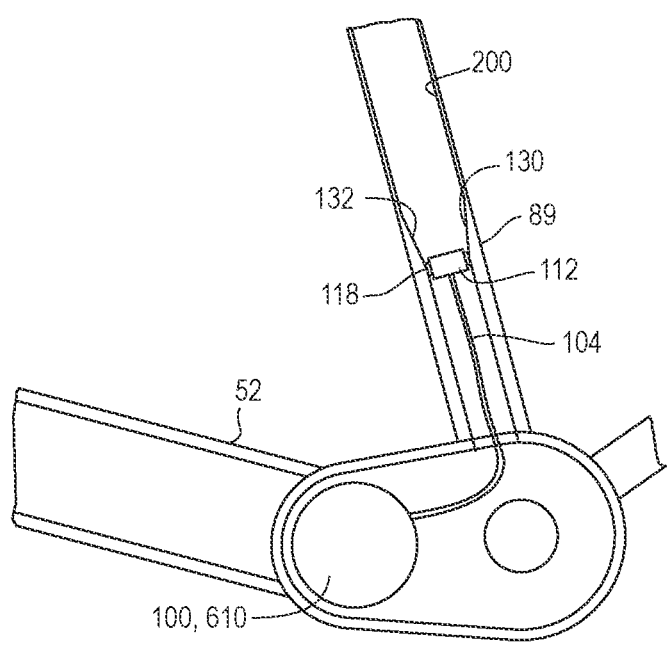
FIG. 9 is an alternative embodiment of the bicycle frame and electrical connector.
Figure 10:
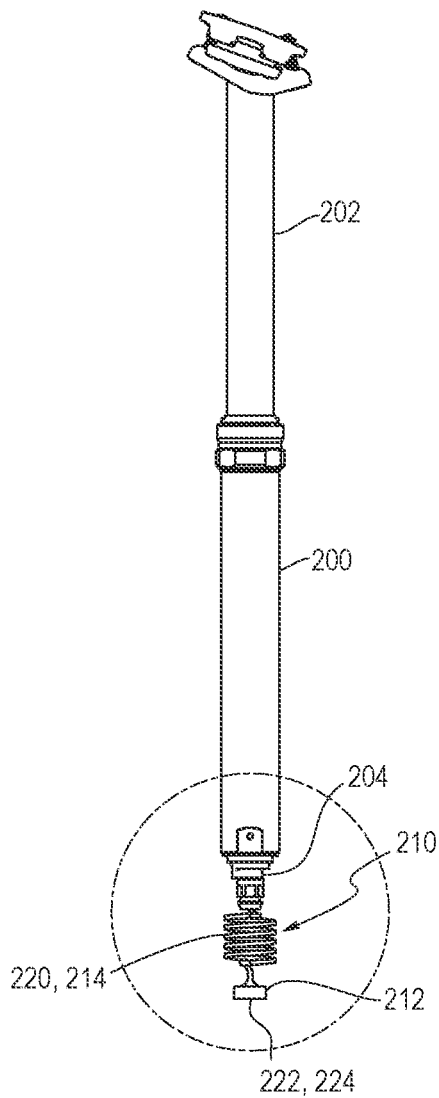
FIG. 10 is a side view of one embodiment of a seat post assembly.

The end terminal 112 may also be moveable in the receiver tube 89, as shown for example in FIGS. 6-8. In this embodiment, a biasing member 120, 122, 124 may be disposed in the receiver tube 89. The biasing member 120, 122, 124 may bias the end terminal 112 along the longitudinal axis 2, for example biasing the end terminal upwardly in the receiver tube 89. The biasing member 120, 122, 124, otherwise referred to as a force providing member, maintains an equilibrium position 126, as shown in FIG. 8, but may allow for movement in a downward longitudinal direction 131 or an upward longitudinal direction 128 within the receiver tube 89 in response to a load, or force F, applied to the end terminal 112 by the first tube 200 of the seat post assembly 80, or the connector 210 extending from the end of the first tube 200, as the tube 200 is moved along the longitudinal axis 2 from the disengaged position to the engaged position in the receiver tube 89, or vice versa is pulled out of the receiver tube 89. As the end terminal 112 is pushed or pulled by the connector 210, and an end terminal 212 in particular, the biasing member 120, 122, 124 applies a force to the end terminal 112, to push or pull the end terminal 112 toward the end terminal 212 to automatically electrically connect the end terminals 112, 212. The biasing member 120 may also or push or pull the end terminal 112 toward the equilibrium position 126 once the end terminals 112, 212 are disconnected. The phrase "electrically connected" refers to the connection being capable of passing current, for example when a controller provides a signal to supply current through the connection but does not mean current is passing through the electrical connection at all times.

In one embodiment, the biasing member 120 may be configured as a spring, for example a coil spring, that applies a force F to the end terminal 112. The biasing member 120 may apply a downwardly acting force F on the end terminal 112 if the end terminal 112 is being displaced upwardly in the direction 128 along the longitudinal axis 2 in the receiver tube 89, or the biasing member 120 may apply and upwardly acting force on the end terminal 112 if the end terminal 112 is being pushed downwardly in the direction 131 along the longitudinal axis 2 into the receiver tube 89. The wire(s) 110 from the remote power source 102 may run through the middle of the spring biasing member 120. Alternatively, the wire(s) 110 may be coiled to form an integrated spring biasing member 120. The bottom of the spring acts against and is secured to a bottom surface 123 of the receiver tube 89. In another embodiment, the biasing member 120 only applies an upwardly acting force to the end terminal 112, acting against the bottom surface 123, but does not apply a downwardly acting force to the end terminal 112.

In another embodiment, the end terminal 112 may include a biasing member 122 made of a magnetic material, or a biasing member 124 made of a ferromagnetic material. In one embodiment, biasing member 122 is a solid-state magnet having a 7 mm diameter. The biasing member 122 may be a permanent magnet, or an electromagnet. The term "magnetic" refers to a material being magnetized, while the term "ferromagnetic" refers to a material that is attracted to a magnet but is not itself magnetized. The biasing members 122, 124 may magnetically attract a corresponding biasing member 222, 224 on the mating end terminal 212, with the biasing member 222 made of a magnetic material and the biasing member 224 made of a ferromagnetic material. In operation, the biasing members 122, 124, 222, 224 on the end terminals 112, 212 are attracted, or apply a force F to the end terminals 112, 212 causing them to engage and connect. The biasing members may also both be made of a magnetic material, with mating opposing poles that are attracted to each other.

In operation, the connector 210, or wire(s) 214 thereof, may have some slack or extra length, allowing the end terminal 212 to move relative to the end portion 204 of the first tube 200, for example by moving in a downward direction 131 downwardly into the receiver tube 89 in response to a force applied by the biasing member 122, 124, 222, 224.

In one embodiment, shown in FIGS. 2, 4 and 6-8, the bottom of the receiver tube includes a guide 130 having a guide surface 132, which guides the end terminal 212 toward the end terminal 112. In one embodiment, the end terminal 212 slides along the guide surface 132, if the end terminal is not centered along the axis 2, until the end terminal 212 engages the mating end terminal 112. In other embodiments, the guide 130 and guide surface 132 may be omitted.

The attraction of the biasing members 122, 124, 222, 224 alone, or in combination with a force applied by one of the biasing members 120, 220, or further in combination with the end terminal 212 engaging and sliding along the guide surface 132, ensures that the end terminals 112, 212 are automatically connected as the first tube 200 is moved from the first position to the second position. In one embodiment, the guide surface 132 forms an angle α less than 90 degrees relative to the longitudinal axis 2 as shown in FIG. 8. In some embodiments, α is between and including 20 degrees and 60 degrees. In one embodiment, the bottom of the receiver tube 89 includes an opening 134 to provide access to, and accommodate movement of, the end terminal 112, such that the guide surface 132 has a frustoconical shape. It should be understood that the guide 130 may be made as a separate insert disposed in the bottom of the receiver tube 89, which may have a cylindrical interior space, or may be integrally formed in the bottom of the receiver tube.

Figure 11:
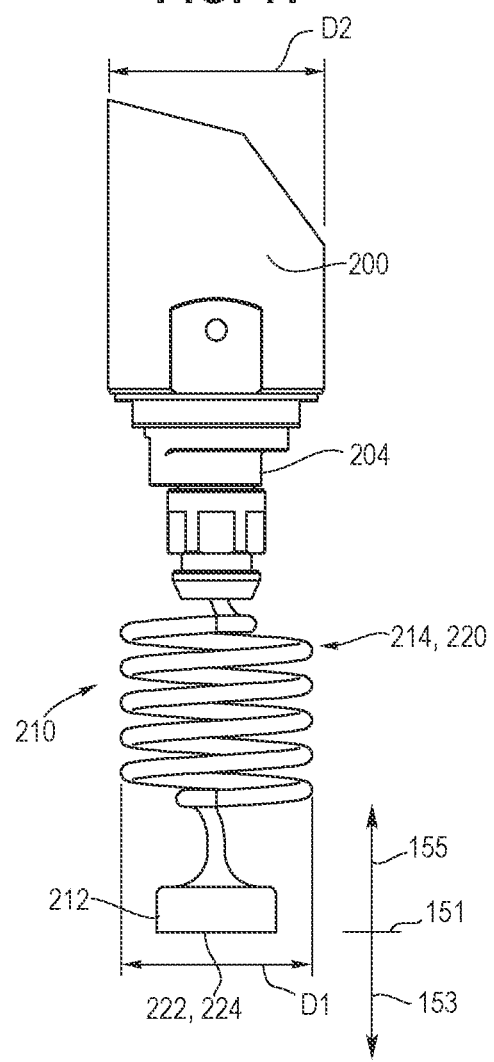
FIG. 11 is an enlarged partial view of the seat post assembly taken along line 11 of FIG. 10.
Figure 12:
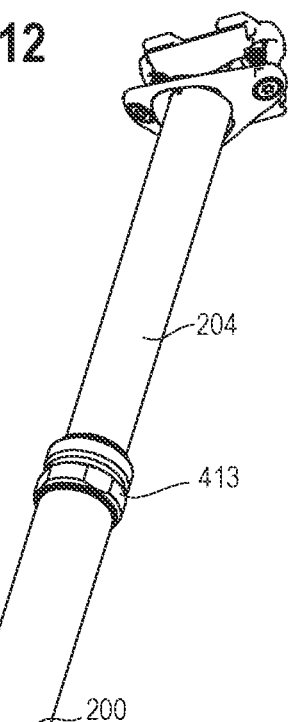
FIG. 12 is a perspective view of the seat post assembly shown in FIG. 10.
Figure 14:
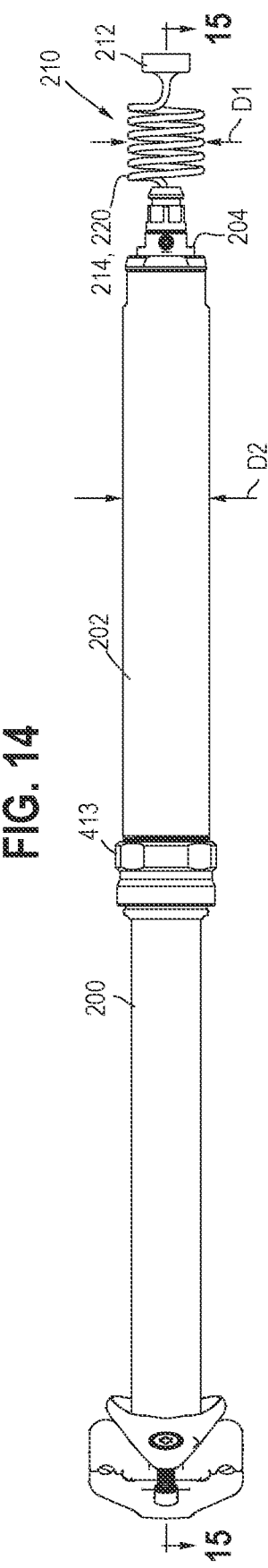
FIG. 14 is a side view of one embodiment of a seat post assembly.
Figure 15:
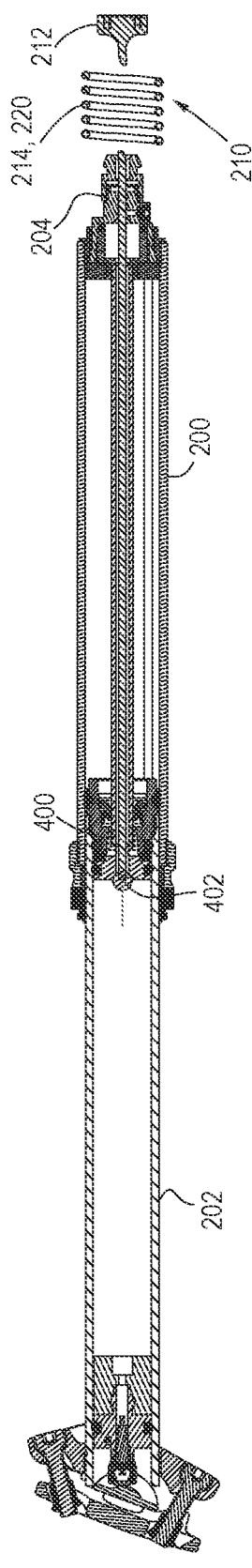
FIG. 15 is a cross sectional view of the seat post assembly taken along line 15-15 in FIG. 14.
Figure 16:
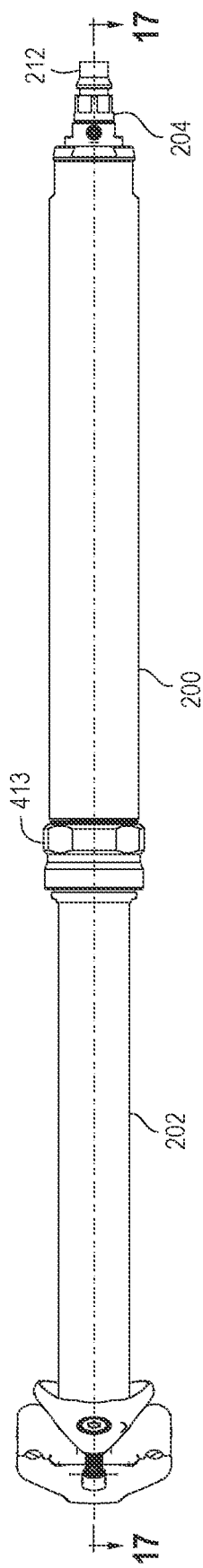
FIG. 16 is a side view of another embodiment of a seat post assembly.
Figure 17:
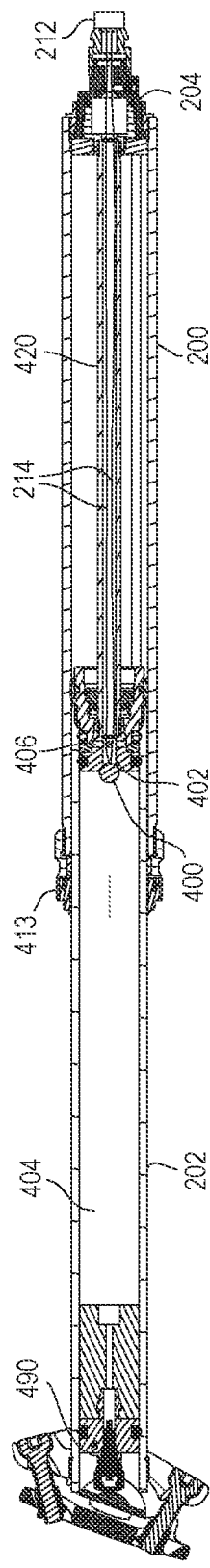
FIG. 17 is a cross sectional view of the seat post assembly taken along line 17-17 in FIG. 16.

In one embodiment, a plurality of biasing members may be acting on the end terminals 112, 212, including for example a first biasing member 120 configured as a spring, and second and third biasing members 122, 124, 222, 224, for example made of magnetic and/or ferromagnetic materials. In one embodiment, the connecting wire(s) 214 may be coiled, so as to thereby form the biasing member 220 which is disposed and connected between the bottom end portion 204 of the first tube 200 and the end terminal 212. As with the biasing member 120, the biasing member may apply a force to the end terminal 212 as the end terminal is moved away or toward the end portion 204 in downward and upward directions 153, 155 relative to an equilibrium position 151, as shown in FIG. 11. Alternatively, connecting wires 214 may run through the middle of a separate spring connected between the end portion 204 of the tube 200 and the end terminal 212. The coiled wire(s) 214, or spring, may have a diameter (D1) the same as or smaller than the outer diameter (D2) of lower, first tube 200, as shown in FIGS. 11 and 14. In one embodiment, D1 is less than 150% of D2. The coiled connecting wire(s) 214 allows the electrical connector 210, and the end terminal 212 portion in particular, to move closer or further away from the lower end portion 204 of the first tube without straining the coiled connecting wire(s) 214. For example, during installation, the biasing members 220, 122, 124, 222, 224 may pull the end terminal 212 downwardly in the receiver tube until the end terminal 212 is automatically electrically connected with the end terminal 112.

As the seat post assembly 80 is pulled out of the receiver tube 89, the end terminal 212 is moved upwardly along the longitudinal axis 2. The coiled wire 214 and biasing member 220, or biasing member 120, may be extended thereby creating an extension force that increases until the spring force of the biasing member 120, 220 surpasses a magnetic holding force between the connected end terminals 112, 212, or until a force applied by the user overcomes the magnetic holding force, created by the biasing members 122, 124, 222, 224. In one embodiment, the connection force <50N. After the connection force is overcome, the end terminals 112, 212 thereafter separate and the seat post assembly 80 is automatically electrically disconnected from the power source 102, such that the seat post assembly 80 may be pulled out of the receiver tube 89 once the clamping ring 91 is released. The separation force is less than a force that may permanently (e.g., plastically) deform or damage the coiled connecting wire 214 or biasing member 120. In this way, the seat post assembly 80 is configured with an automatic power connector, which automatically electrically connects the seat post assembly 80 with the power source 102 simply by inserting or moving the seat post assembly 80 in a first direction 135 along the longitudinal axis 2 until the end terminals 112, 212 are connected by the biasing members 120, 220, 122, 222, 124, 224, or vice versa are disconnected by the biasing force being overcome by moving the seat post assembly in a second opposite direction 133 out of the receiver tube 89. The insertion and removal cycle, with the attendant automatic electrical coupling of the seat post assembly 80 with the remote power source 102, may be repeated, while avoiding any need to manually grasp or otherwise manipulate one or both of the connectors 104, 210 and/or end terminals 112, 212.

In one embodiment, the system is configured with only a biasing member 120 in the receiver tube 89 or a biasing member 220 extending from the first tube 200, with other biasing members 122, 124, 222, 224 being omitted, meaning there is no need for a magnet or ferromagnetic material for coupling. The spring biasing members 120, 220 have a spring rate sufficient to ensure that the end terminals 112, 212 are pushed together to make an electrical connection when the seat post assembly 80, and the lower, first tube 200 in particular, is inserted and moved to an engaged, first position in the receiver tube 89. The spring rate is sufficient to generate automatic connector force during installation to hold the end terminals 112, 212 snugly against each other for a reliable electrical connection. In this embodiment, no coupling force is applied to the seat post assembly during removal of the seat post assembly in the direction 133, such that any wire deformation or damage is avoided.

Conversely, in other embodiments, an additional biasing force may be applied in combination with one of the biasing members 120, 220, for example between a combination of biasing members 122, 224, or biasing members 124, 222. In yet another embodiment, the biasing members 120, 220 may be omitted, with various combinations of the biasing members 122, 124, 222, 224 acting on the end terminals 112, 212.

Figure 13A:
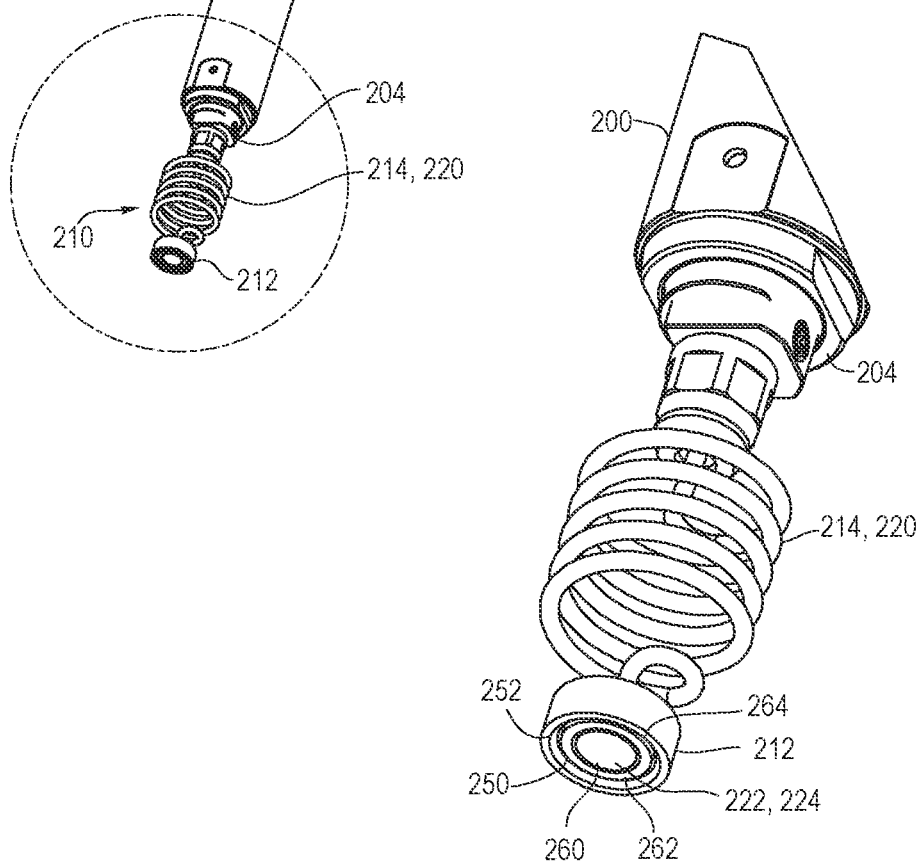
FIG. 13A-13C are enlarged, partial perspective views of various embodiments of the electrical connector for the seat post assembly shown in FIG. 12.
Figure 13B:
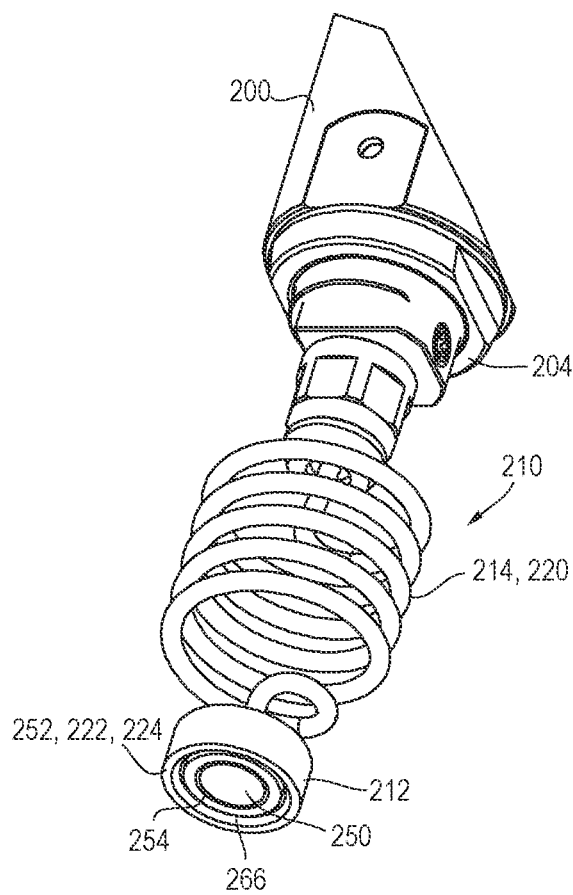
Figure 13C:
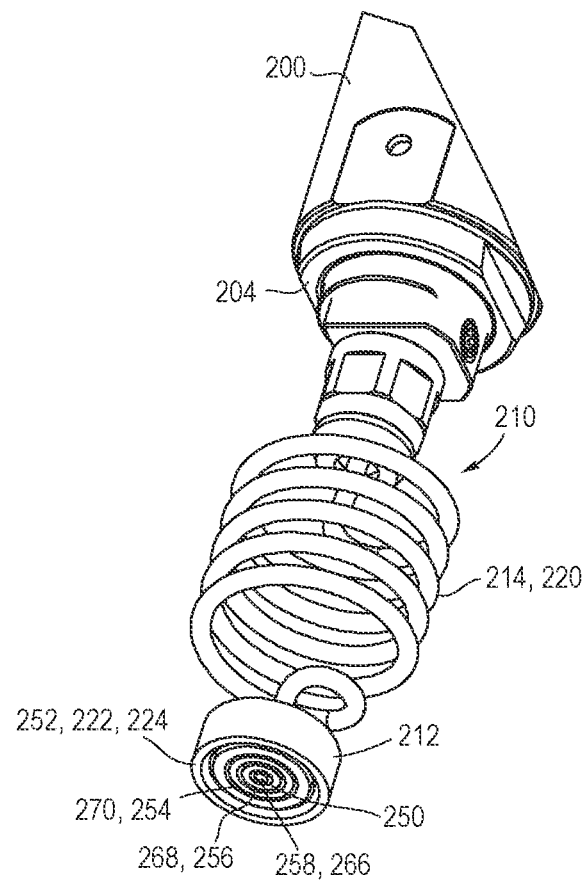

Referring to FIGS. 13A-C, both end terminals 112, 212 include an electrical contact, which may include a positive terminal 250 and a negative terminal 252, or only a positive terminal 250, as well as one or more data signal terminals 254, 256, 258, otherwise referred to as signal contact. For example, as shown in FIG. 13A, the end terminal 212 includes a positive terminal 250, a negative terminal 252, and one of the biasing members 222, 224, which may be formed of the magnetic or ferromagnetic material. The negative terminal 252 and the biasing member 222, 224 made of the magnet/ferromagnetic material may be integrally formed as the same contact. In one embodiment, the biasing member 224, 224 defines a central portion 260, which may be circular, while the positive terminal 250 and the negative terminal 252 are configured as annular rings 262, 264, otherwise referred to as annular contacts, positioned radially outwardly of the central portion 260. The circular and annular configuration ensures that no particular rotational position is required of the positive or negative terminals 250, 252, otherwise referred to as contacts, to ensure a proper electrical connection, including a positive terminal 250 to positive terminal 250 connection and a negative terminal 252 to negative terminal 252 connection. It should be understood that the mating connector 104, including the end terminal 112 disposed in the receiver tube 89, includes the same and corresponding positive terminal 250, negative terminal 252, biasing member 122, 124 and signal terminals 254, 256, 258, also referred to as annular contacts.

As shown in FIG. 13B, the end terminal 212 includes an additional signal terminal 254 for communication of any electrical signals. The signal may be communicated from a pressure transducer, a position sensor, load cell, a counter, a data line, etc. In this embodiment, the signal terminal 254 is configured as an annular ring 266 radially disposed between the positive terminal 250, which is defined by the central circular portion 260 and is otherwise referred to as a center axis contact, and the negative terminal 252 defined by the outer annular ring 264, which may also define the biasing member 222, 224 made of a magnetic or ferromagnets material.

As shown in the embodiment of FIG. 13C, the end terminal 212 includes a plurality of signal terminals 254, 256, 258, defined by annular rings 266, 268, 270, radially disposed between a central portion 260 defining the positive terminal 250, and an outermost annular ring 264 defining the negative terminal 252. The negative terminal 252 also define the biasing member 222, 224 made of the magnetic or ferromagnets material. The plurality of signal terminals 254, 256, 258 provide for multiple signal contacts and signal communications.

Referring to FIGS. 14-31, the seat post assembly 80 includes an electric actuator 400, 410, which controls a positioning assembly, in this embodiment, includes a valve 402, 412 located between a positive chamber 404 and a negative chamber 406. The valve 402, 412 adjusts the volumes of the positive and negative chambers to expand or contract the seat post assembly. The electric actuator 400, 410 is adapted to be automatically electrically connected to the power source 102 when the first tube 200 is moved from the first position to the second position, and automatically electrically disconnected from the power source 102 when the first tube 200 is moved from the second position to the first position. The electric actuator 400, 410 is moveable between first and second positions in response to an electrical current adapted to be transmitted from the power source 102 when the first tube 200 is in the first position. The valve 402, 412 is actuatable between a closed position when the electric actuator 400, 410 is in the first position and an open position when the electric actuator 400, 410 is in the second position.

Figure 22:
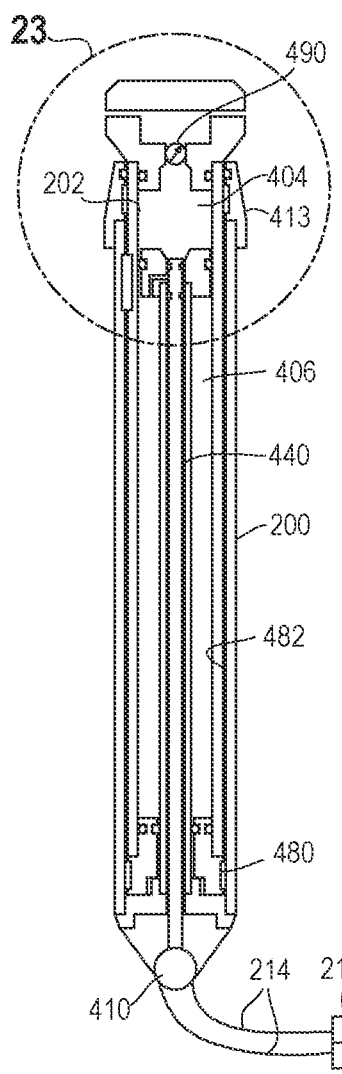
FIG. 22 is a sectional view of a schematic of one embodiment of a seat post assembly in a lowered position.
Figure 23:
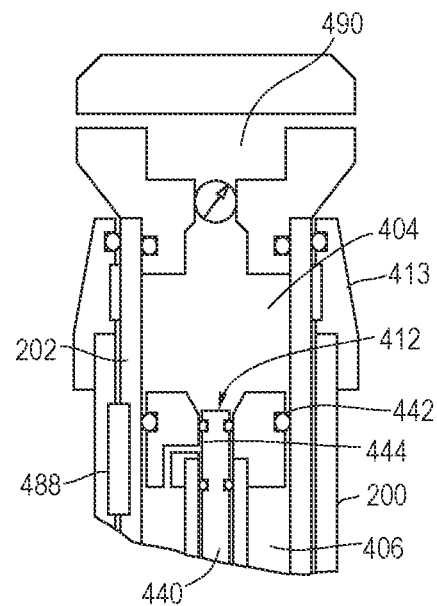
FIG. 23 is an enlarged partial sectional view of the seat post assembly taken along line 23 in FIG. 22, with the valve in a closed position.
Figure 24:
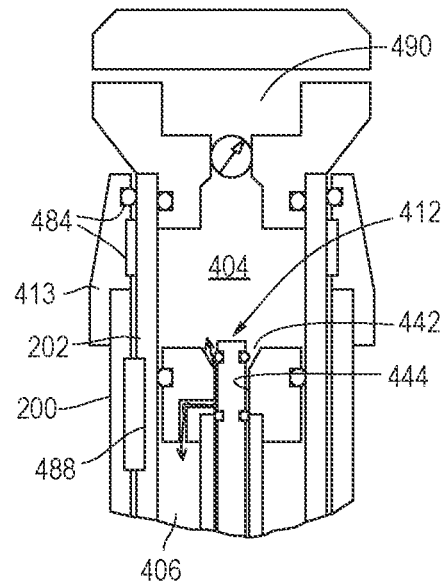
FIG. 24 is an enlarged, partial sectional view of the seat post assembly with the valve in an open position.
Figure 27:
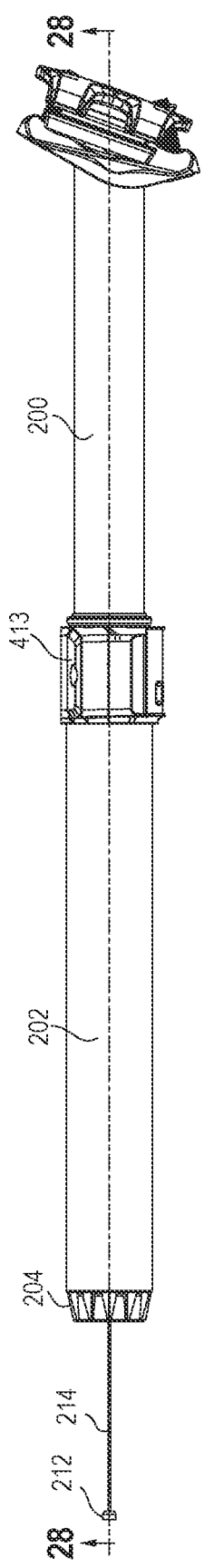
FIG. 27 is a side view of another embodiment of a seat post assembly.
Figure 28:
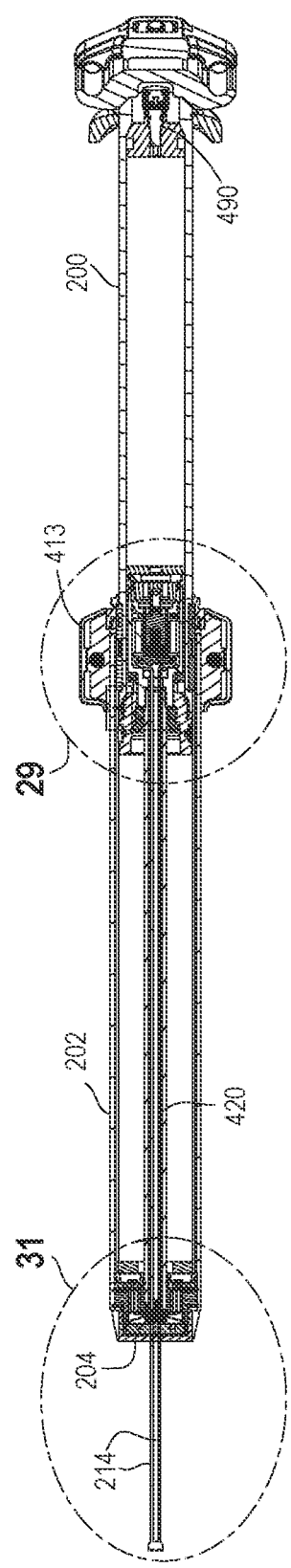
FIG. 28 is a cross-sectional view of the seat post assembly taken along line 28-28 in FIG. 27.
Figure 29:
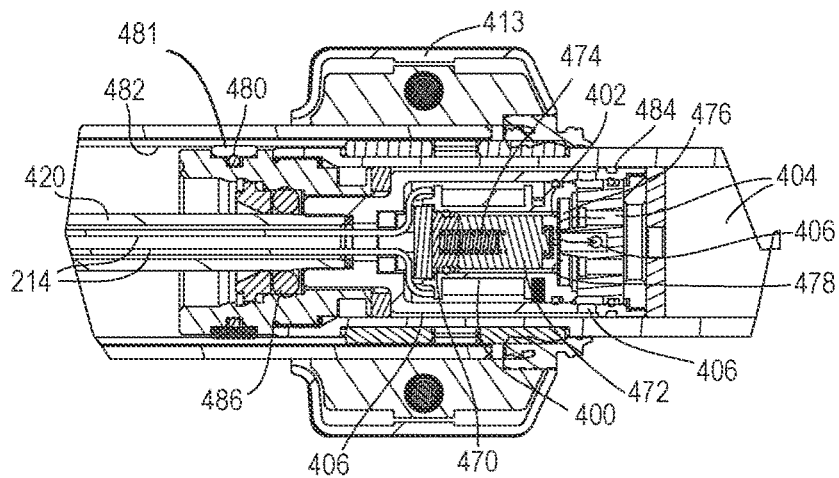
FIG. 29 is an enlarged, partial view of the seat post assembly taken along line 29 in FIG. 28, with the valve in an open position.
Figure 30:
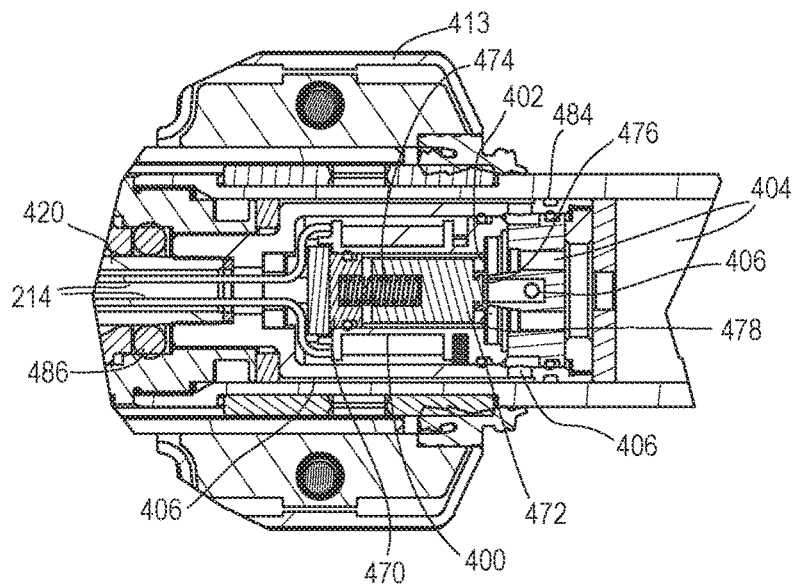
FIG. 30 is an enlarged, partial view of the seat post assembly with the valve in a closed position.
Figure 31:
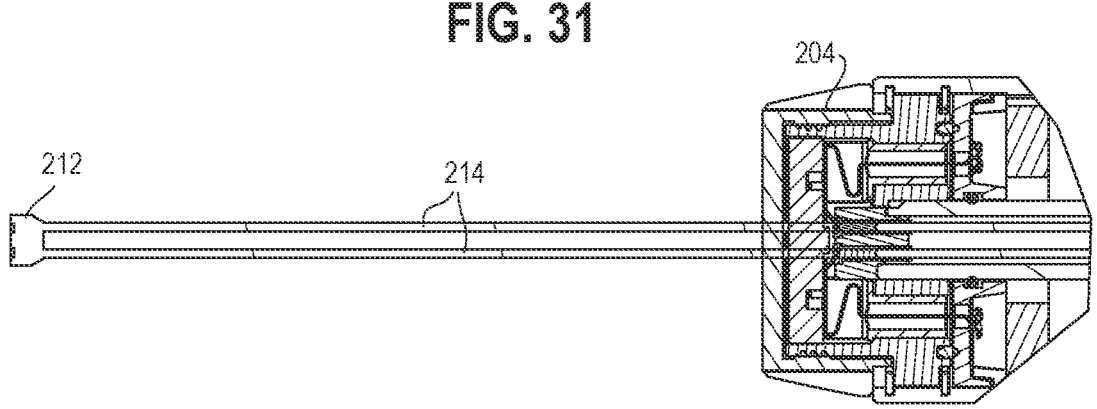
FIG. 31 is an enlarged, partial view of the seat post assembly taken along line 31-31 in FIG. 28.

When the valve 402, 412 is in a closed position, as shown in FIGS. 22, 23 and 30, the valve 402, 412 prevents the flow of a compressible fluid such as air between positive and negative chambers 404, 406. Alternatively, the fluid may be a noncompressible fluid such as a hydraulic oil. The positive and negative chambers are defined by the upper, second tube 202 and the lower first tube 200, such that the lower, first tube 200 and the upper, second tube 202 are maintained in a fixed position relative to each other. When the valve 402, 412 is moved to an open position by the actuator 400, 410, as shown in FIGS. 24, 28 and 29, the upper, second tube 202 and the lower, first tube 200 may be telescopingly moved relative to each other for user adjustment, for example between a retracted position and an extended position.

Figure 20:
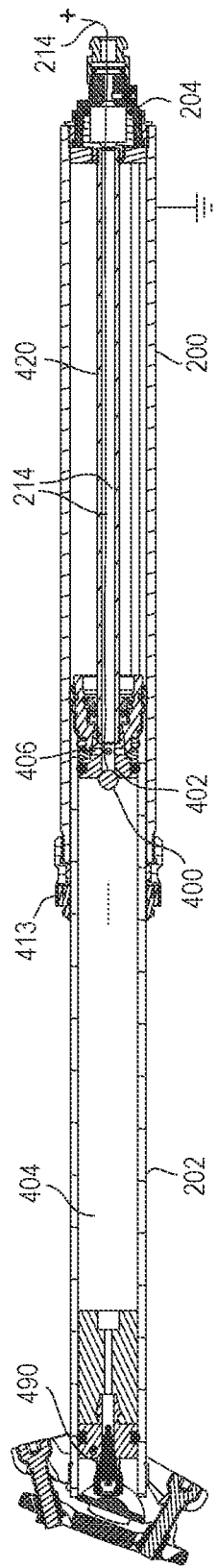
FIG. 20 is a cross sectional view of another embodiment of a seat post assembly.

The actuator 400 may be located at an upper end of the first tube 200, as shown in FIGS. 15, 17, 19, 20, 21 and 28-20, or the actuator 410 may be located at a lower end of the first tube 200, as shown in FIGS. 23-26. In the first embodiment, the electrical wires 214 are connected to the actuator 400 at one end and run through an access tube 420 and out the bottom of the lower tube, where they are connected to the end terminal 212 positive and/or negative terminals 250, 252. The wire(s) 214 may include positive and negative voltage wires as shown in FIGS. 18 and 19 or may include only a single positive voltage wire 214 as shown in FIG. 20. In the latter embodiment, the lower first tube 200 acts as a chassis grounded negative voltage terminal portion of the circuit. In this embodiment, a negative voltage terminal of the actuator 400 is electrically connected to, or in electrical communication with, the lower, first tube 200. In this embodiment, the lower, first tube 200 is made of an electrically conductive material, such as metal. The positive voltage wire 214 is coupled to the positive terminal 250 on the end terminal 212, which may be automatically electrically connected to the battery positive terminal 250 while the lower, first tube 200 is electrically connected to the battery negative terminal 252. For example, the receiver tube 89 may be in electrical communication between the power source 102 and the first tube by way of a direct connection with the first tube 200.

Figure 21:
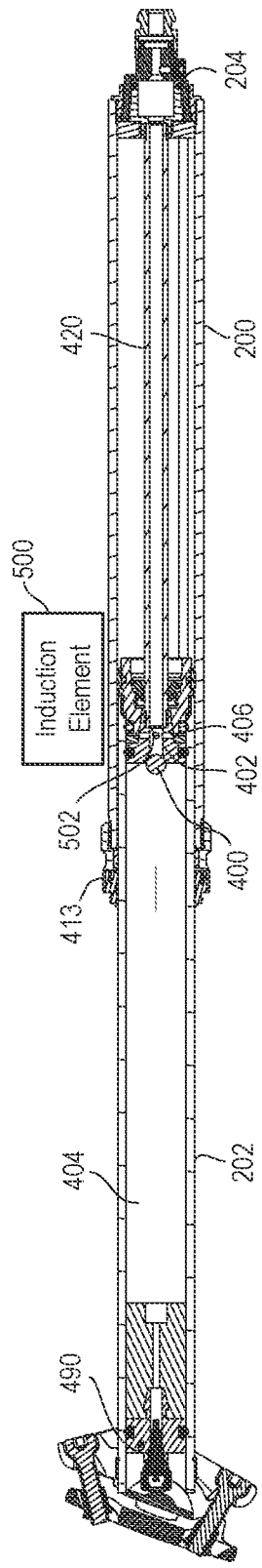
FIG. 21 is a cross sectional view of another embodiment of a seat post assembly.

In one embodiment, shown in FIG. 21, the seat post assembly 80 is configured with an induction powered actuator 502. An external induction element 500 is mounted proximate to the lower tube 200 and is electrically connected to the power source 102 so as to wirelessly power the actuator 502. In one embodiment, the induction element 500 is disposed on or in the receiver tube 89 portion of the frame 52 and is in electrical communication with the power source 102. As the seat post assembly 80 is moved in the downward direction 135 along the longitudinal axis 2 into the receiver tube 89, the induction powered actuator 502 is moved into an electrical charging field of the induction element 500, such that the actuator 502 may be powered by the remote power source 102 by way of a wireless coupling. In this embodiment, there is biasing member to ensure the electrical connection, and there is no removal force experienced when de-coupling the seat post assembly 80 from the power source 102. Rather, the automatic electrical connection is established merely by moving the seat post assembly 80, and the first tube and associated induction powered actuator 502, to a first position within the field of the induction element 500. The induction element 500 may be moved or positioned at various longitudinal locations on the frame 52 to accommodate different mounting positions of the seat post assembly 80 in the frame, which is fixed by engagement of the clamping ring 91. Alternatively, the induction element 500 may have a sufficiently long charging field to accommodate the different positions of the seat post assembly 80, and first tube 200 in particular, when mounted in the receiver tube 89. Installation and removal of the seat post assembly 80 may therefore be repeated through a lifetime of use with no risk of connection loss or electrical component damage.

Referring to FIGS. 22-26, the actuator 410 is located at the lower/bottom end of the lower, first tube, which eliminates the need to run wires up through the lower, first tube. The connector 210 extending from the bottom of the first tube may be coiled to form a biasing member 220, or may not be coiled, but rather are configured as a flexible wire(s) 214. In one embodiment, the wires 214, extend from the bottom, exterior end of the first tube 200 at least 25 mm. In the latter embodiment, the connector includes a magnetic or ferromagnetic biasing member 222, 224. The actuator 410 acts on a valve push rod 440, moving the rod 440 longitudinally along the axis 2, to actuate the valve 412, and move the valve 412, and in particular a valve head 442, between a closed position where the valve head 442, configured as an O-ring, engages a valve seat 444, as shown in FIGS. 22 and 23, and an open position where the valve head 442 is moved off of, or out of engagement with, the valve seat 444, shown in FIG. 24.

The seat post assembly 80 may be moved between a bottommost or retracted position, as shown in FIG. 22 and an uppermost or extended position, shown in FIG. 25, and any intermediate position therebetween, as shown for example in FIG. 25. The seat post assembly 80 adjustment may be infinite or discrete within the overall height range of the seat post assembly.

Referring to FIGS. 22-24 and 27-30, the actuator 400, 410 may be configured in any way so as to generate a linear movement along the longitudinal axis 2, for example of the push rod 440 as shown in FIGS. 22-24, or of a first component 470 relative to a second component 472 as shown in FIGS. 27-30. For example, the actuator 400 may be configured as a solenoid actuator, which includes first and second components 472, 470 biased away from each other by a spring 474. The first component 472 includes a valve head 476, which moves relative to a valve seat 478. The spring 474 biases the first component 472 and associated valve head 478 to a normally closed position in engagement with the valve seat 478. When powered with electricity from the power source 102, the actuator 400 is moveable and moves the first component 472 toward the second component 470 against the biasing force of the spring 474. The movement of the actuator moves the valve head 476 away from the valve seat 478 and thereby opens the valve 402. It should be understood that the actuator may be configured as a gear motor, or other type of actuator capable of opening or closing a valve by way of the actuator moving between first and second positions, whether such movement is linear, rotary, a combination thereof, or some other movement.

In either of the embodiments, a compressible fluid may flow through the valve 402 from the positive chamber 404 to the negative chamber 406, or vice versa, to move the second tube 202 relative to the first tube 200 and thereby raise and/or lower the seat 56. Alternatively, an incompressible fluid may flow through the valve 402. Compressed air biases the second tube upwardly when the user removes a load from the seat 56 and the valve 402, 412 is opened. An O-ring 480 is provided on the end of the upper, second tube and acts as a spring to preload a bushing 481 against an interior wall 482 of the lower, first tube to minimize assembly slop. Seal 484 is on the valve assembly and engages the interior wall of the upper, second tube. The upper, second tube also includes a seal 486 that slides along and engages the central access tube running along the center axis of the lower tube. An anti-rotation key 488 may be positioned on one or the other of the first and second tubes and engage the other of the first and second tubes to prevent the tubes from rotating relative to each other so as to maintain the orientation of the seat connected to the top of the seat post assembly. The seat post assembly 80 may include a fill valve 490 located at the upper end of the upper, second tube 202 to fill the chambers with compressed air. The fill valve 490 is a Schrader valve.

Figure 5:
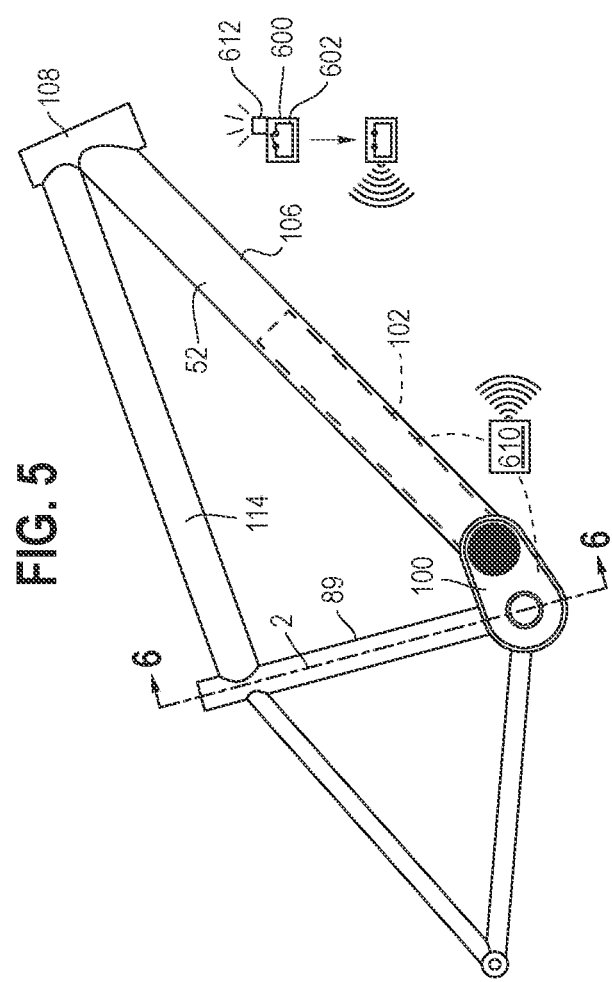
FIG. 5 is a side view of a bicycle frame configured with a motor, power source and wireless signal generator.

Referring to FIGS. 2 and 5, a user interface 600, such as a lever or button, may be located on the handlebar 54. As the user engages the interface, a signal generator 602, configured as a switch in one embodiment, sends a signal to electrically powered actuator 400, 410, for example when the switch is closed. The signal from the signal generator 602 to the power source 102, or controller 610 associated therewith, causes electricity to flow through the connectors 104, 210 and between the engaged terminals 112, 212, thereby causing the actuator 400, 410 to move and open the valve 402, 412. The controller 610 is configured to control the electrical current transmitted by the power source through the electrical connector 104. The signal may be communicated wirelessly, by wire, or mechanically. The electric actuator 400, 410 is moveable between first and second positions in response to the electrical current transmitted from the power source 102 when the first tube 200 is in a first position. The valve 402, 412 is actuatable, or moveable, between a closed position when the electric actuator 400, 410 is in the first position and an open position when the electric actuator 400, 410 is moved to the second position. The interface 600 may be configured with an indicator 612, such as an LED and/or speaker emitting an audible signal, to alert the user that the automatic electronic connection between the power source 102 and the seat post assembly 80 has been achieved.

As the seat post assembly 80 is inserted into the frame 52, and the receiver tube 89 in particular, the electrical connector 210, and the end terminal 212 in particular, may be urged into alignment with the corresponding connector 104 and associated end terminal 112 by the frame connector guide surface 132, or attracted to the connector 104 way of forces applied by the biasing members 122, 124, 222, 224, or simply pushed by the force of a spring biasing member 120, 220, whether disposed on the seat post assembly 80 or in the receiver tube 89, or both.

The seat post assembly, as shown in FIGS. 16-20, may have a non-moveable end terminal 212, which is connected by engagement with the end terminal 112 on the receiver having a biasing member 120. Conversely, the receiver tube 89 may not be configured with any biasing member, or both the seat post and receiver tube may be configured with single or multiple biasing members, for example a spring 120, 120 and/or biasing members 122, 124, 222, 224 made of magnetic/ferromagnetic material. Or the automatic connection may be achieved without any biasing member, for example by mere positioning of an induction actuator 502 relative to an induction element 500.

A communication interface provides for data and/or signal communication from the interface 600 to the energy storage device 102, via a controller 610, or to the actuator 400, 410, such that the actuator may be actuated and moved to thereby open or close the valve 402, 412. The communication interface communicates the data using any operable connection. An operable connection may be one in which signals, physical communications, and/or logical communications may be sent and/or received. An operable connection may include a physical interface, an electrical interface, and/or a data interface. The communication interface may be configured as the wireless communication system which communicates wirelessly, and as such may include one or more antennae. The communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof. In an embodiment, the communication interface may be configured to transmit a signal indicative of a power determined from a measured strain of a body. Further, the determined power may be transmitted wirelessly.

In accordance with various embodiments of the present disclosure, methods described herein may be implemented with software programs executable by a computer system, such as the circuitry. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a power meter system 40 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A seat post assembly comprising:
a first tube moveable along an axis between a first position and a second position;
a second tube telescopically moveable along the axis relative to the first tube between a retracted position and an extended position;
a positioning assembly configured to adjustably position the second tube relative to the first tube; and
an electric actuator adapted to be automatically electrically connected to a power source when the first tube is moved from the first position to the second position, and wherein the electric actuator is adapted to be automatically electrically disconnected from the power source when the first tube is moved from the second position to the first position, wherein the electric actuator is movable to actuate the positioning assembly in response to an electrical current adapted to be transmitted from the power source when the first tube is in the first position to adjustably position the second tube relative to the first tube.

2. The seat post assembly of claim 1 wherein the electric actuator is movable between first and second positions in response to an electrical current adapted to be transmitted from the power source when the first tube is in the first position, the positioning assembly comprises a valve actuatable between a closed position when the electric actuator is in the first position and an open position when the electric actuator is in the second position.

3. The seat post assembly of claim 1 wherein the electric actuator is an induction powered actuator.

4. The seat post assembly of claim 1, wherein the electric actuator is a solenoid actuator.

5. The seat post assembly of claim 1 further comprising an electrical connector connected to the electric actuator.

6. The seat post assembly of claim 5 wherein the electrical connector extends from an end of the first tube.

7. The seat post assembly of claim 6 wherein the electrical connector comprises a positive voltage terminal, and wherein the first tube is electrically conductive and defines a negative voltage terminal.

8. The seat post assembly of claim 6 wherein the electrical connector comprises negative and positive voltage terminals.

9. The seat post assembly of claim 6 wherein the electrical connector comprises a flexible wire, an end terminal and a biasing member, wherein the end terminal is moveable toward and away from the end of the first tube, and wherein the biasing member biases the end terminal away from the end of the first tube.

10. The seat post assembly of claim 9 wherein the flexible wire is coiled and defines a spring.

11. The seat post assembly of claim 9 wherein the end terminal comprises a magnetic or ferromagnetic material.

12. The seat post assembly of claim 11 wherein the magnetic material has a magnetic force less than or equal to 50N.

13. The seat post assembly of claim 9 wherein the end terminal comprises an annular contact defining one of a negative or positive terminal.

14. The seat post assembly of claim 13 wherein the end terminal further comprises a center axis contact defining the other of a negative or positive terminal.

15. The seat post assembly of claim 14 wherein the annular contact comprises an outermost first annular contact, and wherein the end terminal further comprises a second annular contact disposed between the center axis contact and the first annular contact, wherein the second annular contact defines a signal contact.

16. The seat post assembly of claim 1 further comprising the power source located remote to the first and second tubes, and a power source connector extending from the power source, wherein the power source connector comprises a flexible wire and an end terminal, wherein the end terminal is moveable toward and away from the end of the first tube when the first tube is in the first position.

17. The seat post assembly of claim 16 wherein the flexible wire is coiled and forms a spring defining a biasing member.

18. A seat post assembly comprising:
a first tube having a first end and a second end;
a second tube telescopically moveable along an axis relative to the first tube between a retracted position and an extended position;
an electrical connector extending from a first end of the first tube, wherein the electrical connector comprises an end terminal moveable toward and away from the first end of the first tube, wherein the electrical connector comprises a biasing member configured to bias the end terminal away from the first end of the first tube;
an electric actuator electrically connected to the electrical connector, wherein the electric actuator is moveable between first and second positions in response to an electrical current adapted to be transmitted through the electrical connector; and
a valve actuatable between a closed position when the electric actuator is in the first position and an open position when the electric actuator is in the second position.

19. The seat post assembly of claim 18 wherein the end terminal comprises a positive voltage terminal, and wherein the first tube is electrically conductive and defines a negative voltage terminal.

20. The seat post assembly of claim 18 wherein the end terminal comprises negative and positive voltage terminals.

21. The seat post assembly of claim 18 wherein the electrical connector comprises a coiled flexible wire and the coiled flexible wire defines a spring.

22. The seat post assembly of claim 18 wherein electrical connector comprises a spring defining the biasing member.

23. The seat post assembly of claim 18 wherein the biasing member comprises a magnetic or ferromagnetic material.

24. The seat post assembly of claim 18 further comprising a receiver tube, wherein the first end of the first tube is inserted into the receiver tube, and wherein the receiver tube comprises a guide surface forming an angle less than 90 degrees relative to the axis, wherein the guide surface is engageable with the end terminal as the first tube is inserted into the receiver tube.

25. The seat post assembly of claim 23 wherein the guide surface has a frustoconical shape.

26. The seat post assembly of claim 25 wherein the end terminal comprises a magnetic or ferromagnetic material defining the biasing member.

\* \* \* \* \*